(12) United States Patent
Bezemer et al.

(10) Patent No.: US 6,237,206 B1
(45) Date of Patent: May 29, 2001

(54) WHEEL PULLING AND TRANSPORTING DEVICE

(75) Inventors: Cornelius John Bezemer; Gordon George Molson, both of Brantford (CA)

(73) Assignee: Kiene Diesel Accessories, Inc., Addison, IL (US)

(*) Notice: Subject to any disclaimer, the term of this patent is extended or adjusted under 35 U.S.C. 154(b) by 0 days.

(21) Appl. No.: 09/041,455

(22) Filed: Mar. 12, 1998

(51) Int. Cl.[7] .................................................. B25B 27/00
(52) U.S. Cl. .................................................. 29/273
(58) Field of Search ........................... 269/17; 254/2 R; 29/273, 426.3; 414/426, 427, 428

(56) References Cited

U.S. PATENT DOCUMENTS

| | | |
|---|---|---|
| 1,305,322 | 6/1919 | Towler . |
| 1,426,835 | 8/1922 | Mohrman . |
| 1,705,011 | 3/1929 | Godman . |
| 1,889,965 | 12/1932 | Kendall . |
| 2,235,953 | 3/1941 | Whitfield . |
| 2,640,604 | 6/1953 | Curley . |
| 2,807,380 | 9/1957 | Boehnke . |
| 3,145,859 | 8/1964 | Barosko . |
| 3,830,387 | 8/1974 | Virnig . |
| 3,847,294 | 11/1974 | Davenport . |
| 4,042,139 | 8/1977 | Pernsteiner et al. . |
| 4,056,207 | 11/1977 | Spilker . |
| 4,635,336 | 1/1987 | Ades et al. . |
| 4,729,157 | 3/1988 | McCue . |
| 4,771,531 | 9/1988 | Asher . |
| 4,908,925 | 3/1990 | Johnson . |
| 4,930,966 | 6/1990 | Chien . |
| 5,112,070 | 5/1992 | Hahn . |
| 5,479,688 | 1/1996 | Rubino et al. . |

Primary Examiner—Robert C. Watson
(74) Attorney, Agent, or Firm—Reed Smith LLP (57) ABSTRACT

The present invention is directed to a device for pulling a wheel from a wheel hub. The device includes a frame, which frame has a threaded hole therethrough, and retainer means for retaining the device in engagement with the wheel hub. The device also includes a threaded shaft in rotatable engagement with the threaded hole, and with a retainer means for retaining the device in engagement with the wheel hub. The device still further includes substantially torqueless fastening means, affixed to the frame, for releasably attaching the frame to the wheel. The shaft may be rotated to urge the frame away from the wheel hub, thus exerting a force upon the wheel through the substantially torqueless fastening means. The substantially torqueless fastening means may be any fastening arrangement in which there is substantially no net torque on the wheel about the center of the wheel hub when the force is exerted upon the wheel by rotation of the shaft.

7 Claims, 6 Drawing Sheets

WHEEL PULLING AND TRANSPORTING DEVICE

FIELD OF THE INVENTION

This invention relates to the field of truck repair and maintenance, and, more particularly to devices useful in the removal and replacement of truck wheels.

BACKGROUND OF THE INVENTION

During the repair or maintenance of trucks, it is frequently necessary to remove wheels from trucks, including pairs of wheels that operate together on large trucks. Such removal may be necessary for changing a tire during routine maintenance. Alternatively, it may be necessary to remove the wheel to perform maintenance or repair on the brakes, which are located behind the wheels.

The two most common methods for mounting pairs of truck wheels on an axle are stud-piloted mounting and hub-piloted mounting. In a hub-piloted mounting system, the wheels, and the inner wheel in particular, fit very snugly onto the wheel hub, which is affixed to the end of the truck axle. Generally, the tolerance between the circumference of the inner wheel rim and the wheel hub is very small, measured in thousandths of an inch. With hub-piloted mounting, the weight of the truck is supported by the wheel hub at the point where the inner wheel fits onto the wheel hub.

With respect to maintenance and repair, the time between removals of a pair of wheels can often be as long as 18 months. Because of the tiny tolerance between the inner wheel and the wheel hub, and because the wheel hub bears the weight of the truck, extended use of the truck frequently causes the inner wheel rim to become fused or seized upon the wheel hub.

Although hub-piloted inner wheels are those most likely to become seized, any kind of wheel, including an outer wheel and a stud-piloted wheel, may become seized, and therefore may be difficult to remove.

Because the wheel is seized upon the wheel hub, it is impossible to remove the wheel by hand, either while standing in front of the wheel or by pushing the wheel from under the truck. The common practice in such cases is for the mechanic to slide under the truck and hammer on the seized wheel with a large hammer, such as a sledghammer, until the wheel comes loose.

Such a method for removing the wheel is not adequate for a number of reasons. First, there is a serious risk of injury to the mechanic, who is swinging a large hammer in a small space under the truck. Second, it is possible that the mechanic, in hammering the seized wheel, will damage the wheel. The mechanic may also damage some other portion of the truck if his hammering is not accurate and the hammer hits something other than the seized wheel. Third, it is often necessary to hammer on the seized wheel for an extended period of time before the wheel comes loose. Therefore, this method for removing seized wheel is inconvenient, as well as potentially damaging to the truck and dangerous for the mechanic.

Furthermore, this method for removing the seized wheel is frequently unsuccessful, even after an extended period of hammering on the seized wheel. In such a case, it is necessary to remove from the axle the wheel hub and wheel together, and then attempt to separate the hub and wheel when the wheel is off of the truck. This creates significant extra work for the mechanic, who must subsequently replace the hub on the axle.

There are a number of devices in existence which can be used to pull wheels or other devices from an axle, indicating that solutions to problems relating to the pulling of wheels have been long sought-after. These include:

| U.S. Pat. No. | Inventor(s) | Date of Issue |
| --- | --- | --- |
| 4,930,966 | Chien | June 5, 1990 |
| 2,640,604 | Curley | June 2, 1953 |
| 1,305,322 | Towler | June 13, 1919 |
| 1,426,835 | Mohrman | August 22, 1922 |
| 1,705,011 | Godman | March 12, 1929 |
| 1,889,965 | Kendall | December 6, 1932 |
| 2,235,953 | Whitfield | March 25, 1941 |
| 2,807,380 | Boehnke | September 24, 1957 |
| 3,830,387 | Virnig | August 20, 1974 |
| 3,847,294 | Davenport | November 12, 1974 |
| 4,042,139 | Pernsteiner et al. | August 16, 1977 |
| 4,635,336 | Ades et al. | January 13, 1987 |
| 4,908,925 | Johnson | March 20, 1990 |
| 5,479,688 | Rubino et al. | January 2, 1996 |

All of the devices disclosed in these patents disclose devices for removing wheels or similar devices from axles. However, none of these relates directly to hub-piloted truck wheels.

U.S. Pat. Nos. 4,042,139 and 2,640,604, for example, disclose devices for removing truck wheels, or wheels from other heavy industrial equipment, from axles. However, none of these devices is directed to the problem of removing seized hub-piloted inner truck wheels from wheel hubs.

U.S. Pat. No. 4,930,966 issued to Chien also discloses a tire removal device which can be used on trucks, but it is not directed to the problem of removing seized hub-piloted inner wheels, nor does it provide for the even distribution of and application of the substantial force necessary to remove seized hub-piloted inner truck wheels. The absence of a solution to this problem in the prior art is indicated by the continuing practice by mechanics of using sledgehammers to remove seized hub-piloted inner wheels.

SUMMARY OF THE INVENTION

Removal of hub-piloted inner truck wheels poses a particular problem for mechanics performing maintenance on trucks. Because the weight of the truck is borne at the point that the inner wheel fits onto the hub, long use of the truck often results in the hub-piloted inner wheel becoming seized upon the hub.

This situation requires a device for removing a seized wheel from a wheel hub. Preferably, such a device would exert sufficient force, applied in an appropriate manner, to cause a seized truck wheel to be removed from a wheel hub.

Accordingly, the present invention is directed to a device for pulling a wheel from a wheel hub. The device includes a frame, which frame has a threaded hole therethrough, and retainer means for retaining the device in engagement with the wheel hub. The device also includes a threaded shaft in rotatable engagement with the threaded hole, and with a retainer means for retaining the device in engagement with the wheel hub. The device still further includes substantially torqueless fastening means, affixed to the frame, for releasably attaching the frame to the wheel. The shaft may be rotated to urge the frame away from the wheel hub, thus exerting a force upon the wheel through the substantially torqueless fastening means. The substantially torqueless fastening means may be any fastening arrangement in which there is substantially no net torque on the wheel about the center of the wheel hub when the force is exerted upon the wheel by rotation of the shaft.

DETAILED DESCRIPTION OF THE PREFERRED EMBODIMENTS

Figure 1:
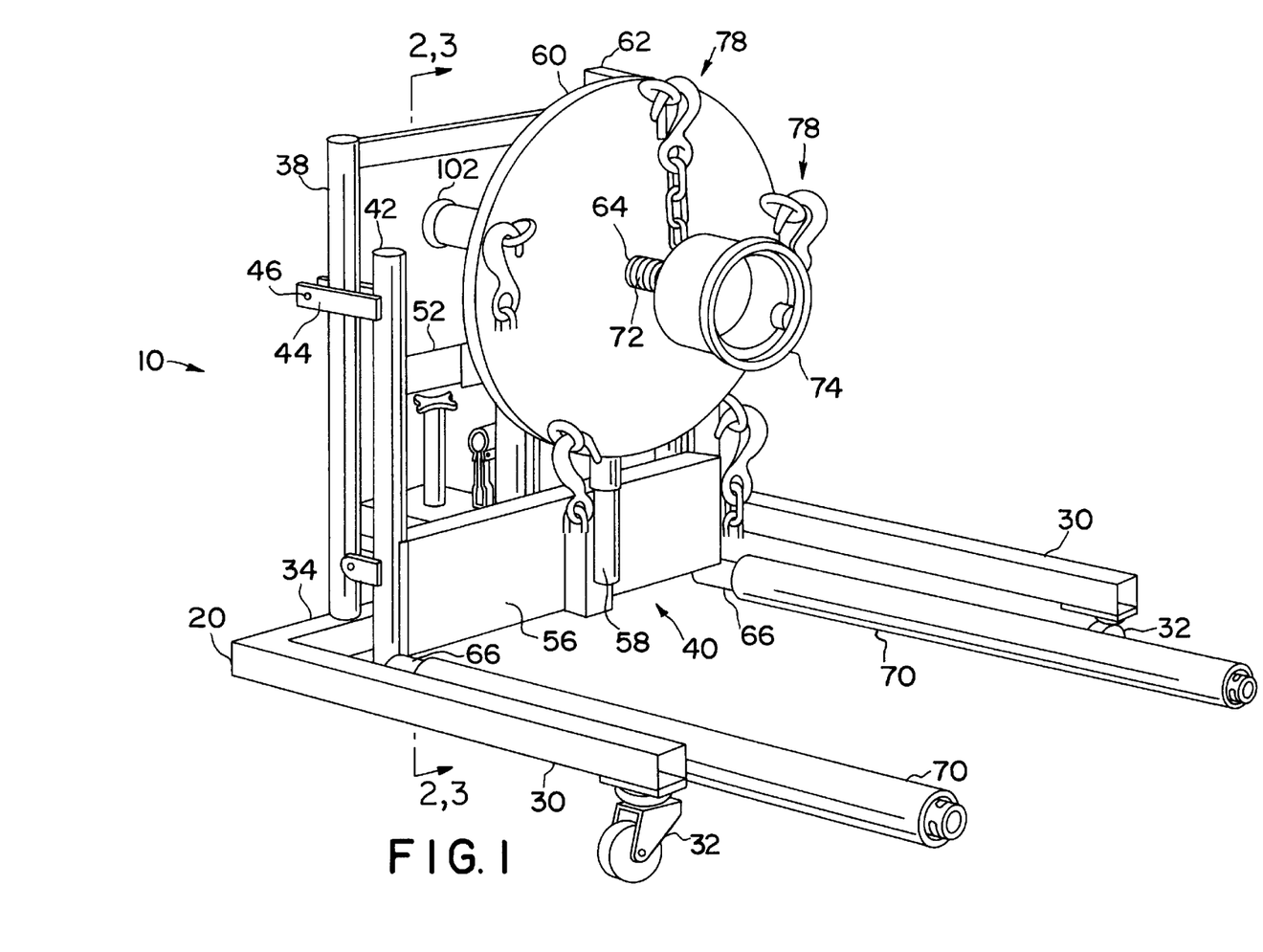
FIG. 1 is a front perspective drawing of the device, according to the present invention.

FIG. 1 shows a device 10 for pulling a wheel from a wheel hub. The device 10 includes a frame 20, the frame 20 being essentially U-shaped and having two forward-projecting members 30, and a connecting member 34. Affixed near the end and at the bottom of these forward-projecting members 30 are swiveling casters 32. A third swiveling caster 32 (shown in FIG. 2) is affixed to a caster support 36, itself affixed to the connecting member 34 substantially at its middle. The swiveling casters 32 provide a means for supporting the device 10 on a floor and a means for conveniently positioning the device 10. It will be appreciated by those skilled in the art that these means for supporting the device 10 on a floor and means for conveniently positioning the device 10 can be a plurality of rollers or casters affixed to the frame 20 such that no portion of the frame 20 is in contact with the floor.

The frame 20 also includes two upright members 38 mounted on the connecting member 34, one substantially at each end of the connecting member 34.

The frame 20 further includes a subframe 40. The subframe 40 includes two upright posts 42. The subframe 40 is affixed to the upright members 38 through two C-clips 44, one welded to each upright post 42 at the upper portion of the upright post 42, and clipped using a dowel pin 46. Mounted on each of the two dowel pins 46 is a roller 48 (shown in FIG. 2) in engagement with the upright members 38, providing a means for smoothly raising and lowering the subframe 40.

Each of the upright posts 42 also has mounted on its lower portion a lower roller 50 in engagement with the lower portion of each of the upright members 38, providing a further means for smoothly raising and lowering the subframe 40. The subframe 40 further includes an upper crossbar 52 extending between and attached to the upper portion of each of the upright posts 42. The upper crossbar 52 includes a flange portion 54 (shown in FIG. 2) extending generally rearwardly over the connecting member 34.

The subframe 40 also includes a lower crossbar 56 extending between and attached to the lower portion of each of the upright posts 42.

The subframe 40 further includes a pilot shaft 58, affixed to the front of and extending vertically from the lower crossbar 56. Also included in the subframe 40 is a plate 60 mounted on the pilot shaft 58 by virtue of a hollow (not shown) in the plate 60, which allows the pilot shaft 58 and the plate 60 to be attached in male-female engagement. In the preferred embodiment, the plate 60 is made of high-strength steel. The plate 60 includes reinforcing steel webbing 62 on its rearward face, which provides a means for reinforcing the plate 60.

The plate 60 has a threaded hole 64 through its centre. It will be apparent to those skilled in the art that to function, the frame 20 need not include the plate 60, and that the threaded hole 64 may be through any portion of the frame 20.

Figure 2:
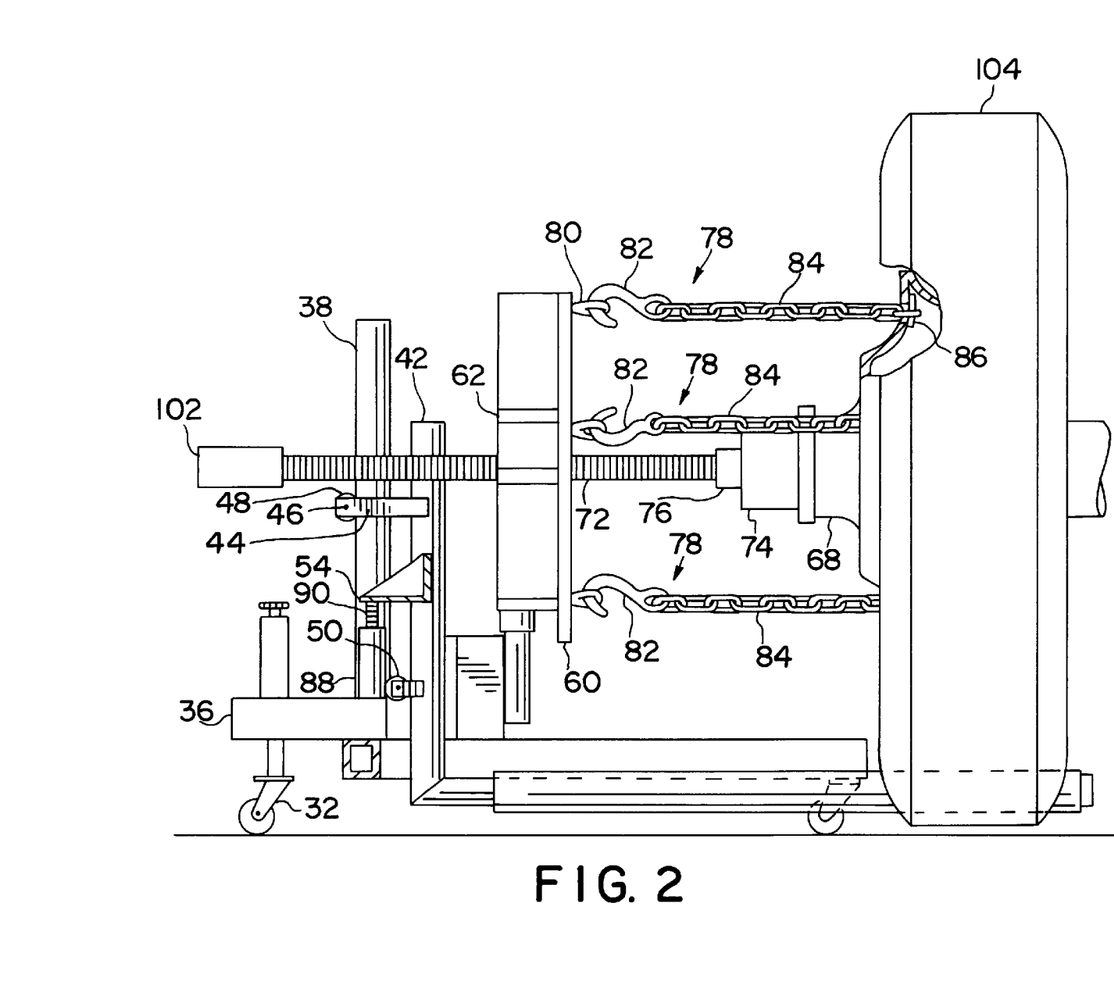
FIG. 2 depicts a cross-section of the device along line 2—2 of FIG. 1.

The subframe 40 further includes two arms 66 projecting forward toward the wheel hub 68 (shown in FIG. 2), the arms 66 being spaced so as to receive a wheel 104 (shown in FIG. 2). It will be appreciated by those skilled in the art that the device 10 may include more than two arms projected forward toward the wheel hub 68. However, it is preferable to have at least two arms 66 in order to conveniently receive the wheel 104.

A sleeve 70 surrounds each of the arms 66 and is rotatably attached to arms 66. In the preferred embodiment, the sleeves 70 are composed of a low friction material such as neoprene plastic, allowing for smooth manipulation of a hub-piloted inner wheel 104 which has been received by the arms 66.

The device 10 further includes a retainer means, in the form of a hub-socket 74, removably engageable with the wheel hub 68 for retaining the device 10 in engagement with the wheel hub 68.

The device 10 still further includes a threaded shaft 72 rotatably engaged with the hub-socket 74 and with the threaded hole 64. In the preferred embodiment, the rotatable engagement between the threaded shaft 72 and the hub-socket 74 is created by a bearing 76 (shown in FIG. 2) affixed to the front end of the threaded shaft 72 and to the rear end of the hub-socket 74.

The threaded shaft 72 includes a means for receiving a wrench in releasable engagement with the threaded shaft 72, in the form of a wrench socket 102. It will be appreciated by those skilled in the art that a wrench can be any tool which is useful in rotating the threaded shaft 72, and that the means for receiving a wrench in releasable engagement with the threaded shaft 72 may be any means which allow a tool for rotating the threaded shaft 72 to be releasably engaged to the threaded shaft 72.

The device 10 includes substantially torqueless fastening means, affixed to the plate 60, for releasably attaching the frame 20 to a wheel to be removed from an axle. The substantially torqueless fastening means are in the form of a plurality of flexible wheel fasteners, designated generally by reference numeral 78, affixed to the plate 60 and releasably attachable to the wheel 104 at points of generally equal radial distance from the axis of rotation of the wheel and generally equidistant from each other along a circumference defined by said radial distance. In the preferred embodiment, the substantially torqueless fastening means includes at least five flexible wheel fasteners 78.

It will be appreciated by those skilled in the art that the substantially torqueless fastening means can be any means for releasably attaching the frame 20 to the wheel 104 wherein, when the threaded shaft 72 is rotated and the device 10 urged away from the wheel hub 68, substantially no torque is exerted by the substantially torqueless fastening means on the wheel 104 about the wheel hub 68.

Referring now to FIG. 2, each flexible wheel fastener 78 comprises a loop 80 welded to the front face of the plate 60 substantially at its circumference. Each flexible wheel fastener 78 also includes a heavy-duty hook 82 releasably attached to the loop 80. Each flexible wheel fastener 78 further includes a high-tensile steel chain 84 attached to the heavy-duty hook 82. The flexible wheel fastener 78 still further includes a T-bar hook 86 attached to the opposite end of the high-tensile steel chain 84, releasably attachable to the rim of the wheel 104.

The device 10 includes a means for varying the height of the plate 60, in the form of a hydraulic jack 88 having a lifting shaft 90. The hydraulic jack 88 is positioned on and attached to the connecting member 34 and beneath he flange portion 54 of the upper crossbar 52, so that the hydraulic jack 88 may exert an upward force through the lifting shaft 90 on the flange portion 54 and vary the height of the subframe 40 and the plate 60.

The device 10 also includes means for adjusting the height of the arms 66, also in the form of the hydraulic jack 88. As the hydraulic jack 88 exerts a force through the lifting shaft 90 upon the flange portion 54, the height of the subframe 40, and thus of the arms 66, may be adjusted.

Figure 3:
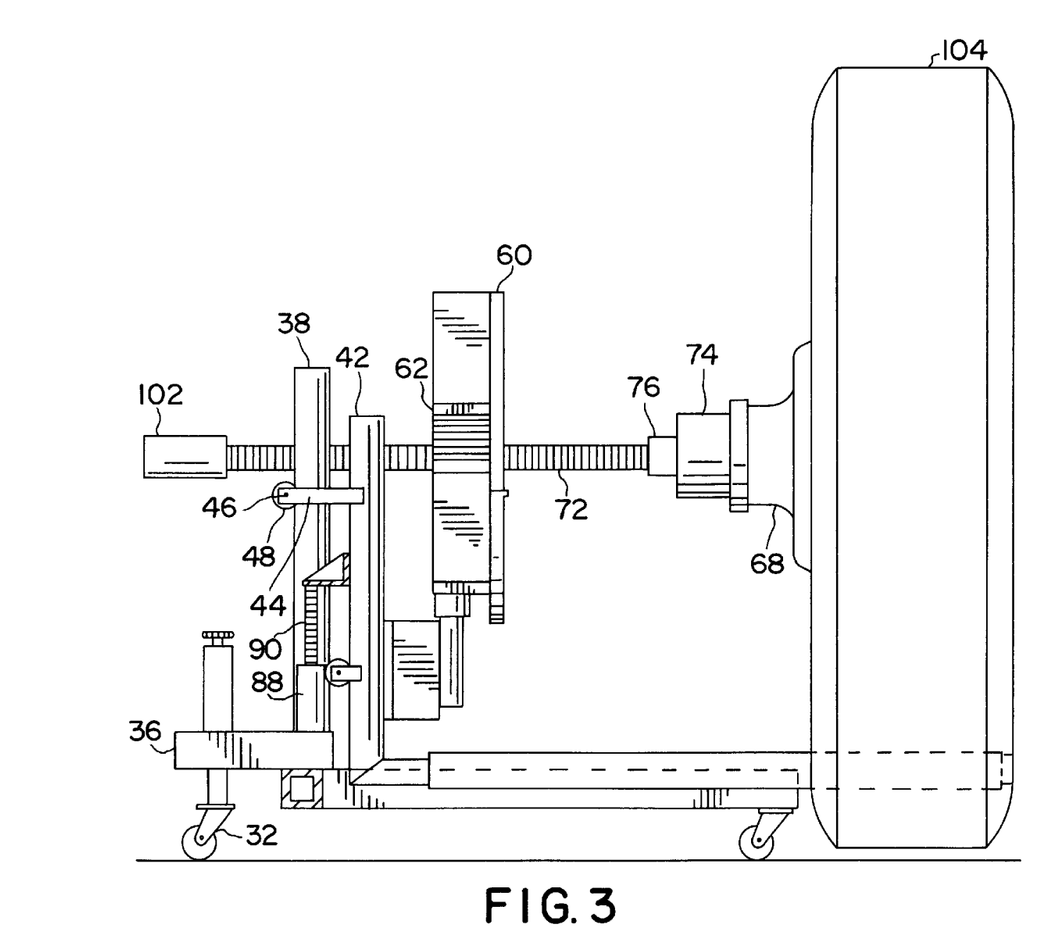
FIG. 3 depicts a cross-section of the device along line 3—3 of FIG. 1, in an alternate position.

FIG. 3 shows the device 10 with the arms 66 having received a wheel. The arms 66 are depicted as having been raised sufficiently so as to lift the wheel 104 off of the floor, thus allowing the hub-piloted inner wheel to be conveniently transported by rolling the device 10 along a floor.

Figure 4:
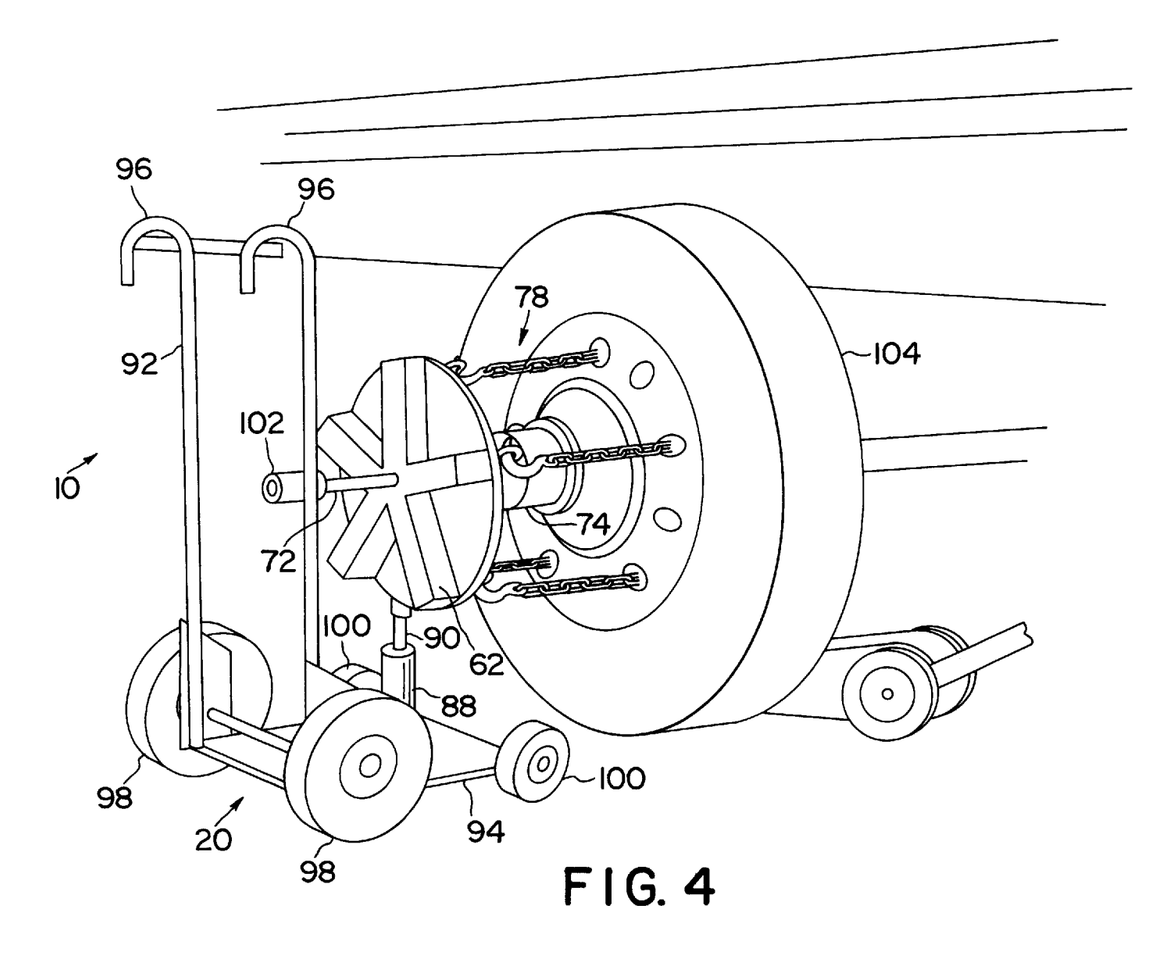
FIG. 4 shows a second embodiment of the present invention.

FIG. 4 depicts a second embodiment of the invention. The frame 20 includes a baseplate 94, and handlebars 92. The handlebars 92 include at their upper ends handles 96 to allow the device 10 to be easily gripped and moved. Furthermore, the handlebars 92 are sufficiently long so that the handles 96 can be gripped and the device 10 moved without requiring a person moving the device 10 to crouch or bend over.

Mounted on the baseplate 90 is the hydraulic jack 88 having a lifting shaft 90. The plate 60 is mounted directly onto the lifting shaft 90, so that the lifting shaft 90 and plate 60 are in male-female engagement.

The device 10 of FIG. 4 further includes back wheels 98 and front wheels 100, attached to the device 10 substantially at the four corners of the baseplate 94 which is, in the preferred embodiment, rectangular. The back wheels 98 are of larger diameter than the front wheels 100. This difference in wheel diameter allows the device 10, when not in use, to be more easily rolled using the back wheels 98. For transport, the device 10 may be tipped so as to be resting only on the back wheels 98.

It will be appreciated by those skilled in the art that the alternate embodiment shown in FIG. 4 is simpler than the preferred embodiment and is not intended to provide a means for receiving and transporting a hub-piloted inner wheel 104.

Figure 5:
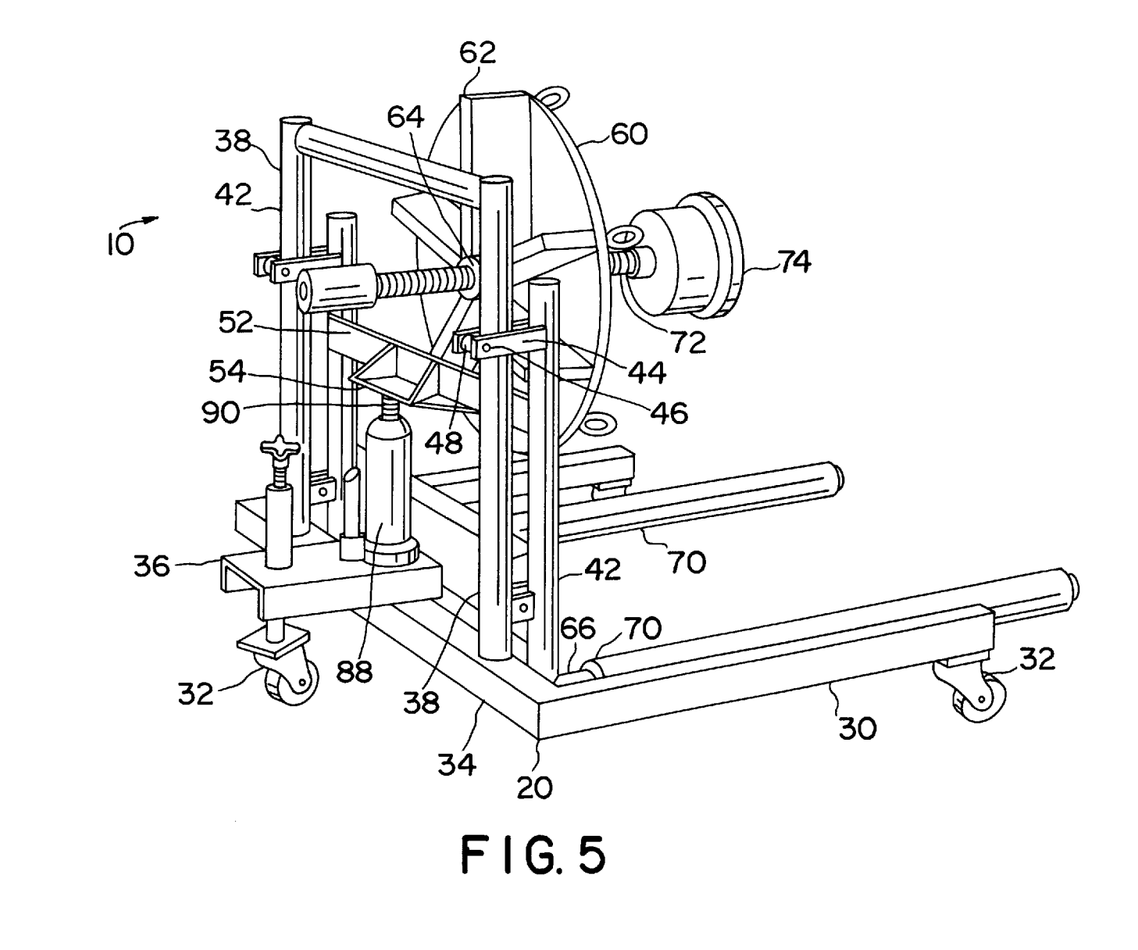
FIG. 5 is a rear perspective drawing of the embodiment shown in FIG. 1, according to the present invention.

FIG. 5 is a rear perspective drawing of the embodiment of the invention shown in FIG. 1, showing clearly the elements of the device 10 located at the rear.

Figure 6:
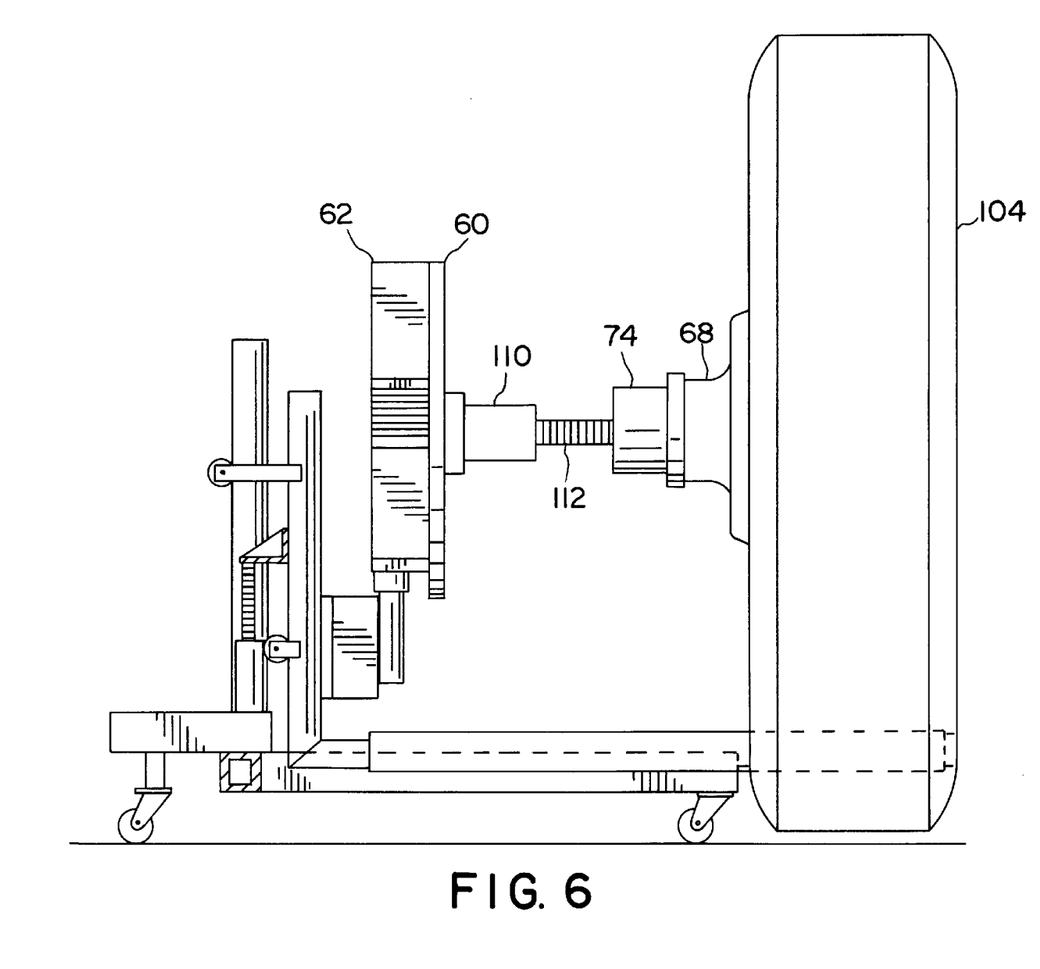
FIG. 6 shows a third embodiment of the present invention.

FIG. 6 depicts a third embodiment of the invention, similar to that shown in FIG. 1, with the following exceptions. The third embodiment does not have a threaded shaft 72, nor does it contain a threaded hole 64 in the plate 60. Rather, the third embodiment has a member projecting device 110 affixed to the plate 60, preferably at the centre of of the plate 60. The member projecting device 110 includes a projectable member 112, a which has affixed to it the hub-socket 74.

The member projecting device 110 is preferably a jack operated by hand, air or electric power. However, it will be appreciated by those skilled in the art that the member projecting device 110 may be any device that can project a projectable member, thus exerting a force upon the wheel hub 68 through the hub-socket 74.

In removing a seized wheel 104 from a wheel hub 68, the device 10 is positioned with the hub-socket 74 removably engaged with the wheel hub 68. The flexible wheel fasteners 78 are releasably attached to the rim of the wheel 104. Next, the threaded shaft 72 is rotated so as to urge the device 10 rearwardly, thus pulling the wheel 104 from the wheel hub 68. When the wheel 104 has been received by the arms 66, the wheel 104 may be transferred by rolling the device 10 along a floor using the swivelling casters 32.

With respect to the embodiment shown in FIG. 6, the device 10 is urged rearwardly by operating the member projecting device 110. The projectable member 112 is projected, thus applying a force through the hub-socket 74 against the wheel hub 68.

It will be apparent to those skilled in the art that various adaptions and variations are possible without departing from the broad scope of this invention, as defined in the appended claims. Some of these variations have been discussed above and others will be apparent to those skilled in the art. However, what is important to the present invention is to provide an easy-to-use and reliable device directed to the problem of seized wheels, which device can exert a force sufficiently evenly distributed and sufficiently large to remove seized wheels.

We claim:

1. A device for pulling a wheel from a wheel hub, the device comprising:

a frame having a threaded hole therethrough;

a retainer removably engageable with the wheel hub;

a threaded shaft rotatably engaged with the threaded hole, a first end of the threaded shaft being rotatably engaged with the retainer;

a plurality of flexible wheel fasteners, each of the wheel fasteners comprising a first end affixed to the frame and a second end, the second ends of the wheel fasteners being releasably attachable to the wheel at points of generally equal radial distance from the axis of rotation of the wheel, the points being generally equidistant from each other along a generally circular path defined by the radial distance;

whereby the threaded shaft may be rotated to urge the frame away from the wheel hub, thus exerting a force upon the wheel through the wheel fasteners.

2. A device for pulling a wheel from a wheel hub, the device comprising:

a frame having a threaded hole therethrough;

a retainer removably engageable with a portion of the periphery of the wheel hub;

a threaded shaft rotatably engaged with the threaded holes a first end of the threaded shaft being rotatably engaged with the retainer;

a plurality of wheel fasteners, each of the wheel fasteners comprising a first end affixed to the frame and a second end releasably attachable with the wheel, wherein each of the second ends of the plurality of wheel fasteners is generally T-shaped;

whereby the threaded shaft may be rotated to urge the frame away from the wheel hub, thus exerting a force upon the wheel through the wheel fasteners.

3. A device for pulling a wheel from a wheel hub the device comprising:

a frame having a threaded hole therethrough;

a retainer removably engageable with a portion of the periphery of the wheel hub;

a threaded shaft rotatably engaged with the threaded hole, a first end of the threaded shaft being rotatably engaged with the retainer;

a plurality of wheel fasteners, each of the wheel fasteners comprising a first end affixed to the frame and a second end releasably attachable with the wheel, wherein each of the second ends of the plurality of wheel fasteners is generally T-shaped and wherein the second ends of the plurality of wheel fasteners are releasably attachable to the wheel at points of generally equal radial distance from the axis of rotation of the wheel, the points being generally equidistant from each other along a generally circular path defined by the radial distance;

whereby the threaded shaft may be rotated to urge the frame away from the wheel hub, thus exerting a force upon the wheel through the wheel fasteners.

4. A device for pulling a wheel from a wheel hub, the device comprising:

a frame having a threaded hole therethrough;

a retainer removably engageable with the wheel hub;

a threaded shaft rotatably enraged with the threaded hole, a first end of the threaded shaft being rotatably engaged with the retainer;

a plurality of flexible wheel fasteners, each of the wheel fasteners comprising a chain having a first generally hook-shaped end affixed to the frame and a second generally T-shaped end, the second ends of the wheel fasteners being releasably attachable to the wheel at points of generally equal radial distance from the axis of rotation of the wheel, the points being generally equidistant from each other along a generally circular path defined by the radial distance;

whereby the threaded shaft may be rotated to urge the frame away from the wheel hub, thus exerting a force upon the wheel through the wheel fasteners.

5. A device for pulling a wheel from a wheel hub, said device comprising:

a frame;

a member projecting device having a projectable member, the member projecting device being affixed to the frame;

a hub socket removably engageable with a portion of the periphery of the wheel hub, the hub socket being disposed on the projectable member;

a plurality of wheel fasteners, each of the wheel fasteners comprising a first end affixed to the frame and a second end releasably attachable with the wheel, wherein each of the second ends is generally T-shaped;

whereby the member projecting device may be operated so that the hub socket is projected against a portion of the periphery of the wheel hub by the projectable member, thus urging the frame away from the wheel hub and exerting a force upon the wheel through the wheel fasteners.

6. A device for pulling a wheel from a wheel hub, the device comprising:

a frame having a threaded hole therethrough;

a retainer removably engageable with the wheel hub;

a threaded shaft rotatably engaged with the threaded hole, a first end of the threaded shaft being rotatably engaged with the retainer;

a plurality of flexible wheel fasteners, each of the wheel fasteners comprising a first end releasably attachable with the frame and a generally T-shaped second end releasably attachable with the wheel;

whereby the threaded shaft may be rotated to urge the frame away from the wheel hub, thus exerting a force upon the wheel through the wheel fasteners.

7. A device according to claim 6 wherein the retainer comprises a socket releasably engageable with a portion of the periphery of the wheel hub.

* * * * *

UNITED STATES PATENT AND TRADEMARK OFFICE
CERTIFICATE OF CORRECTION

PATENT NO. : 6,237,206 B1
DATED : May 29, 2001
INVENTOR(S) : Bezemer et al.

It is certified that error appears in the above-identified patent and that said Letters Patent is hereby corrected as shown below:

<u>Column 6,</u>
Line 51, delete "holes", and substitute -- hole -- therefor.
Line 51, after "hole", add a comma -- , --.
Line 63, after "hub", add a comma -- , --.

<u>Column 7,</u>
Line 22, delete "enraged", and substitute -- engaged -- therefor.

<u>Column 8,</u>
Lines 28 and 29, delete "releasably attachable with", and substitute -- affixed to -- therefor.

Signed and Sealed this

Twentieth Day of April, 2004

JON W. DUDAS
*Acting Director of the United States Patent and Trademark Office*